United States Patent [19]

Glejbøl et al.

[11] Patent Number: 6,126,776
[45] Date of Patent: Oct. 3, 2000

[54] METHOD OF MODIFYING THE SURFACE OF A SOLID POLYMER SUBSTRATE AND THE PRODUCT OBTAINED

[75] Inventors: Kristian Glejbøl, Albertslund; Bjørn Winther-Jensen, Copenhagen, both of Denmark

[73] Assignee: NKT Research Center A/S, Brondby, Denmark

[21] Appl. No.: 09/202,516

[22] PCT Filed: Jun. 27, 1997

[86] PCT No.: PCT/DK97/00279

§ 371 Date: Dec. 15, 1998

§ 102(e) Date: Dec. 15, 1998

[87] PCT Pub. No.: WO98/00457

PCT Pub. Date: Jan. 8, 1998

[30] Foreign Application Priority Data

Jun. 28, 1996 [NO] Norway ..................................... 962772

[51] Int. Cl.[7] ................................. C09J 4/04; C09J 5/02; C08J 3/28; C08J 7/18
[52] U.S. Cl. ..................................... 156/307.1; 156/307.3; 428/364; 428/421; 428/447; 428/474.4; 428/523; 522/116; 522/126; 522/136; 522/139; 522/140; 522/146; 522/915
[58] Field of Search ..................................... 522/116, 126, 522/136, 139, 140, 146, 915; 156/272.2, 272.6, 275.5, 273.3, 273.5, 307.1, 307.3; 428/364, 421, 447, 474.4, 523

[56] References Cited

U.S. PATENT DOCUMENTS

| | | | |
|---|---|---|---|
| 3,977,954 | 8/1976 | Needles et al. | 522/116 |
| 4,333,963 | 6/1982 | Emmons et al. | 522/116 |
| 4,752,426 | 6/1988 | Cho . | |
| 5,348,772 | 9/1994 | Demuth et al. . | |

FOREIGN PATENT DOCUMENTS

| | | |
|---|---|---|
| 0 191 680 | 8/1986 | European Pat. Off. . |
| 0 574 352 A1 | 12/1993 | European Pat. Off. . |
| 741 404 A1 | 11/1996 | European Pat. Off. . |
| 55-131026 | 10/1980 | Japan . |
| 60-229933 | 11/1985 | Japan . |
| 61-89236 | 5/1986 | Japan . |
| 63-215737 | 9/1988 | Japan . |
| 4-159336 | 6/1992 | Japan . |
| 4-159337 | 6/1992 | Japan . |
| 5-309131 | 11/1993 | Japan . |
| 6-87964 | 3/1994 | Japan . |

OTHER PUBLICATIONS

"Modification of Polyolefin Surfaces by Plasma–Induced Grafting," Johnsen, et al. Journal of Applied Polymer Science, vol. 59, No. 30, Mar. 1996, 1651–1657.

"Surface structures and adhesion characteristics of poly(tetrafluorethylene) films after modification by graft copolymerization, " J. Adhes, Sci. Technol. 1996, 725–743.

"Grafting organic coupounds onto fibrous textile materials, " Malcik, et al. Czech., CAPLUS accession No. 1982:53774.

*Primary Examiner*—Susan W. Berman
*Attorney, Agent, or Firm*—Merchant and Gould P.C.

[57] ABSTRACT

A method of modifying the surface of a solid polymer substrate comprising the steps of a) generating radicals on the substrate surface by subjecting it to a gas plasma or by subjecting it to UV light, and b) treating the surface with a vapor of a monomer or a monomer mixture comprising cyano acrylate and/or isocyanate, where step b) starts before step a), simultaneously with step a), under step a), or follows immediately after step a), and a polymer substrate modified accordingly; a method of binding an organic binder material to a surface of a solid polymer substrate comprising the steps of modifying the surface of the substrate by said method, and bringing the organic material in contact with the surface of the substrate, and a polymer bonded to an organic material by the last mentioned method.

26 Claims, No Drawings

METHOD OF MODIFYING THE SURFACE OF A SOLID POLYMER SUBSTRATE AND THE PRODUCT OBTAINED

The present invention relates to a method of modifying the surface of a solid polymer substrate and the product obtained.

Untreated or unmodified polymer substrates are in general difficult to paint, print on or adhere to. Particularly, it is difficult to achieve a bonding between an untreated polymer surface and an organic top layer.

It is well-known in the art to clean the surface of a polymer substrate or to modify the surface of the substrate in order to change the surface characteristics of the substrate and thereby improve the affinity between the substrate surface and an organic binder.

The surface treatments normally used are flaming, chemical treatment with chrome sulphuric acid, or corona treatment. Flaming is the simplest method. In this method the substrate surface is stroked by a flame. Both the flaming treatment and the chemical treatment are very rough methods which may weaken the cohesiveness of the polymer substrate. Further, it is normally preferred to avoid the use of strong acids in the production. One of the problems of using flame treatment is that the method is not controllable. Often the surface of the polymer is severely degraded due to this treatment.

One of the most conventional methods is corona treatment. By use of this method a number up small sparks are created on the substrate surface (a silent discharge) These sparks often result in an erosion of the surface as well in a generation of free radicals. The free radicals are normally terminated by reaction with oxygen.

The article by K. Johnsen et. al. "Modification of Polyolefin Surfaces by Plasma-Induced Grafting" Journal of Applied Polymer Science, Vol. 59, pp. 1651–1657 (1996), describes a method of modifying polyolefin surfaces by grafting polar monomers onto the surface. The grafting is initiated by a treatment of a LD-PE substrate surface with argon plasma for 5 minutes, whereby free radicals are generated. Thereafter, or simultaneously, the surface is treated with one of the following monomers: Acrylic acid, glycidyl methacrylate, 2-hydroxy ethylacrylate and methyl acrylate. The grafting time was from 7 to more than 90 minutes. The contact angle against water for the (acrylic acid monomer) treated LD-PE surface was improved from about 91.5° to about 38°. However, it was not tested if the affinity between the treated LD-PE surface and an organic binder actually was improved. It was finally concluded that the method is too slow to be of direct industrial application.

A similar method of plasma treatment of PTFE surfaces is described in JP patent application No. 55-131026. A PTFE surface was treated with a He gas plasma for 2–10 minutes and simultaneously treated with N,N-dimethylaniline, N-monomethylaniline, aniline, benzonitrile, benzamide or pyridine monomers. An oxygen plasma treatment of PTFE was conducted without monomer treatment, and peel tests of the PTFE samples showed that there was no significant difference in peel resistance between the PTFE surfaces that were treated with monomers and the PTFE surfaces that were only treated with oxygen plasma. Actually, the latter had a better peel resistance than the monomer treated surfaces.

A method of electroless plating is described in JP application No. 92-240189. In this method a PTFE substrate is irradiated with UV laser in the presence of amine or amide followed by an immersing in an electroless metal plating solvent. This result in a good bonding of the plated metal to the substrate. However, this method can only be used for adhering thin metal layers to polymer substrates.

Another method for treatment of a fluorinated polymer is described in JP patent application No. 90-081728. In this method a polymerisable monomer selected between acrylic acid, styrene sulphonic acid and acrylamide is grafted onto the surface of the resin by coating the surface with a monomer solvent, followed by irradiation of the surface with UV laser.

The object of the present invention is to provide a industrially applicable method of binding a polymer substrate to an organic binder material, which method results in an improved binding strength.

More specifically the object of the present invention is to provide an industrially applicable method of modifying a polymer surface, by use of which method the surface affinity against organic binder material is improved.

Another object of the present invention is to provide a fast method of modifying a polymer surface, by use of which method the surface affinity against organic binder material is improved.

A further object of the present invention is to provide a method of modifying a polymer surface, which does not result in any severe depolymerization of the polymer substrate, in particular when the substrate material exhibits fluorine and/or tertiary carbon atoms, and by use of which method the surface affinity against organic binder material is improved.

These objects are achieved by a method of modifying a surface of a solid polymer substrate comprising the steps of
a) generating radicals on the substrate surface by subjecting it to a gas plasma or by subjecting it to UV light, and
b) treating the surface with a vapour of a monomer or a monomer mixture comprising cyano acrylate and/or isocyanate,
where step b) starts before step a), simultaneously with step a), under step a), or follows immediately after step a).

Polymer surface treatment with plasma or UV light for other purposes is well known in the art. Plasma treatment of polymer surfaces is e.g. used for cleaning purpose. In this known method the generated radicals are often terminated by reaction with oxygen.

The polymer substrate can be of any polymer material provided that free radicals are created on the surface of the material when it is subjected to a gas plasma and/or treated with UV light. Preferably the polymer substrate is a silicon rubber, a polyolefin, or another thermoplastic.

The thermoplastic is preferably selected between polytetra-fluoroethylene (PTFE), tetra-fluoroethylene-hexa-fluoropropylene-copolymer (FEP), polyvinyl-difluoride (PVDF), polyamides, such as e.g. nylon 6.6 and nylon 11, and polyvinyl-chloride (PVC). The polyolefin is preferably polypropylene (PP) or poly (4-methyl-1-pentene) (PMP)

The substrate can have any shape and any size. Preferably the polymer substrate is in the form of film, sheet, pipe, rod, porous or non-porous body, fabric, non-woven fabric, fibres or threads. In one very preferred embodiment the polymer substrate is produced by injection moulding.

When the generation of radicals on the substrate surface is obtained by subjecting the substrate to UV light, the wavelength and the intensity of the UV light are selected depending on the constitution of the polymer. A skilled person can by use of ordinary techniques optimise the method by selecting wavelength and intensity of the UV light as well as selecting the time of radiation. The time of radiation should naturally be sufficiently long to create the radicals on the surface. On the other hand, the time of radiation should not be too long, as this might result in degradation of the substrate.

The generation of radicals on the substrate surface is preferably obtained by subjecting the substrate to a gas plasma. The plasma can be generated by any known methods, but preferably the gas plasma is generated by excitation of a gas in a direct current (DC), audio frequency (AF), radio frequency (RF) or microwave (MW) generated electric field. Most preferably the gas plasma is generated by excitation of a gas in a direct current (DC) or by exitation using radio frequency (RF).

The intensity of the used gas plasma should preferably have a level ensuring creation of radicals in the polymer surface. If the level is too high, this may result in severe damage of the bulk-polymer (depolymerization). Hence, the powerlevel of the plasma should be optimized so that surface radicals are created, but no serious damage is made to the bulk.

A preferred method of generating a plasma is described in the applicant's European patent application No. EP 96610018.2. In this method gas is subjected to an electric field generated by an electrode system comprising n electrodes, n being an integer greater than or equal to 3, preferably between 3 and 30, each of the n electrodes being connected to one of the following AC voltages:

$U_r(t)=U_0\sin(2\pi\ f \cdot t)$
$U_s(t)=U_0\sin(2\pi\ f \cdot t + 2\pi/3)$
$U_t(t)=U_0\sin(2\pi\ f \cdot t - 2\pi/3)$ where f is a frequency in the range from 10 to 10000 Hz, preferably from 30 to 200 Hz, more preferably from 50 to 60 Hz, $U_0$ is a voltage in the range from 50 to 10000 V, at least one electrode being connected to $U_r$, at least one electrode being connected to $U_s$, and at least one electrode being connected to $U_t$. The electrode is preferably placed in a circle.

The gas can be any inert gas or mixtures thereof, preferably a gas selected between He, Ne, Ar and Kr.

By the term "inert gas" is meant a gas that does not react chemically with the polymer surface.

The monomer or monomer mixture preferably comprises one or more of 2- $C_1$–$C_{10}$ alkyl cyano acrylate and diisocyanate, and more preferably one or more of 2-ethyl cyano acrylate and toluene 2,4-diisocyanate. The monomer mixture may also comprise one or more of acrylic acid, methyl acrylate, 2-hydroxy-ethylacrylate, N-ethyl-2-methyl allylamine, glycidyl methacrylate, diallylamine, and/or other vinyl group containing monomers.

More preferably the monomer vapour comprises 60 mole % or more of 2-ethyl cyano acrylate vapour, most preferably 90 mole % or more of 2-ethyl cyano acrylate vapour.

In a particularly preferred embodiment of the invention the monomer mixture prior to vaporization consists essentially of a mixture of 2-ethyl cyano acrylate, a water free acid preferably having a partial vapour pressure which is lower than the partial vapour pressure of 2-ethyl cyano acrylate, and up to 40 weight-% of another filler, preferably a mixture of 2-ethyl cyano acrylate and an acid having a partial vapour pressure in the plasma which is lower than half the partial vapour pressure of 2-ethyl cyano acrylate, most preferably a mixture of 2-ethyl cyano acrylate and a polyphosphoric acid. By "filler" is meant a material which does not act as a monomer under the treatment conditions. Even more preferred, the monomer mixture prior to vaporization consists of a mixture of 60 to 97 weight-% of 2-ethyl cyano acrylate, up to 10 weight-% of polyphosphoric acid and up to 40 weight-% of another filler.

The method is preferably carried out in a reactor which may be at least partly evacuated from air and water vapour. Further, the reactor should have a channel for feeding the inert gas, and a channel for feeding the monomer or monomer mixture. The monomer or monomer mixture is introduced as a gas, e.g. by evaporation from a bottle or by injection, e.g. through a nozzle.

In a preferred embodiment of the invention, the substrate is placed in the reactor, and some or all of the air and optionally water vapour are evacuated.

Inert gas is fed into the reactor, and the plasma is generated (step a)). Before, simultaneously or shortly thereafter monomer or monomer mixture is fed into the reactor (step b)).

The generation step a) is preferably carried out for a period of between 0,01 and 1000 seconds and the treatment step b) is preferably carried out for a period of between 0,1 and 1000 seconds.

The generation step a) is preferably carried out for a period which is equal to or longer than the period of the treatment step b). The treatment step b) may continue when step a) has ended, even though there no longer is generated radicals on the substrate surface. This continuation of step b) will then result in a polymerisation of monomers onto the monomers which already have been bound to the polymer surface.

If the surface of the polymer substrate is contaminated with water, oil or other organic contaminants, step a) is preferably carried out for more than 30 seconds, and step b) is started 10 to 30 seconds after step a) so as to clean the surface before the monomers are polymerized onto the substrate surface. Step a) and b) are preferably ended simultaneously.

The partial pressure of the inert gas or the plasma in step a) is preferably between 0.1 and 10000 Pa.

The monomer pressure in step b) is preferably between 0,1 and 100000 Pa, more preferably between 10 and 1000 Pa.

The total pressure, i.e. the sum of the partial pressures of the air, optionally water vapour, the inert gas or plasma and the monomer, under step a) is preferably equal to the total pressure under step b), the total pressure is preferably between 0,2 and 100000 Pa, more preferably between 0,2 and 10000 Pa, and most preferably between 10 and 1000 Pa.

The temperature is not so important and should preferably be the same under both step a) and step b). Normally the temperature will rise a little under the generation step a). Preferably the temperature under both step a) and step b) is between 250 and 450 K, most preferably between 280 and 330 K.

After having modified the substrate surface as described above and thereby improved its affinity against organic binder material, the substrate and such an organic binder material may be bonded to each other to create a strong bonding.

The present invention therefore also concerns a method of binding an organic binder material to a surface of a solid polymer substrate. This method comprises the steps of
i) modifying the surface of the substrate by the method as described above and
ii) bringing the organic material in contact with the surface of the substrate.

Preferably the modifying step i) is carried out not more than 24 hours before the contacting step ii), most preferably the modifying step i) is carried out between immediately before and 1 hour before the contacting step ii).

The organic binder material may be any organic material which is either solid or is able to solidify e.g. by evaporation of a solvent, or by a chemical hardening. Preferred binder material is a paint, an adhesive or another polymer material, preferably selected between a crosslinkable thermoplastic and a crosslinkable rubber.

The organic binder material may as well be a substrate which may also be surface modified by the method defined in claims 1 to 15.

In a particularly preferred embodiment the organic binder material is subjected to a plasma treatment immediately before the contacting step ii).

The invention also relates to the polymer substrate modified according to the method as defined in claims 1 to 15 as well as the polymer bonded to an organic material by the method as defined in claims 16 and 17.

Further the invention relates to a polymer composite material as defined in claim 20, wherein the polymer substrate is a polymer fiber, a polymer thread or a polymer filler and the organic material is another polymer, Experimental system All pretreatments were carried out in an experimental plasma system, essentially consisting of a 22 liter vacuum vessel having two inlet channels for gas and for monomer, respectively, and an electrode arrangement as described above with reference to the applicant's EP application No. 96610018.2 The plasma is generated using the 3-phase technique described above with a frequency of 50 Hz and $U_0$ of 240 to 280V. 27 electrodes are arranged in a circle around the vacuum vessel with a diameter of 17 cm. Every third of the electrodes is connected to $U_r(t)$, another every third of the electrodes is connected to $U_s(t)$, and the last every third of the electrodes is connected to $U_t(t)$.

The electrodes are made from aluminium rods, having a diameter of 20 mm and a length of 30 cm. When describing the voltage between the electrodes, reference is made to the voltages $U_r$, $U_s$ and $U_t$ as described above.

All pretreatments were carried out by placing the samples in the centre of the vacuum-vessel. The chamber is evacuated by use of an Edwards EH 250 Roots-blower, backed by an Alcatel rotary vane pump. The pressure is monitored using an Alcatel pirani-gauge, mounted on the start of the pumping-line.

The chamber of the vacuum-vessel comprises as mentioned a channel through which it is possible to evaporate 2-ethyl cyano acrylate into the plasma system.

EXAMPLE 1

Pretreatment of polytetraflouroethylene (PTFE)

These experiments were carried out on PTFE strips (Pampos, Germany) having a length of 100 mm, a thickness of 2 mm, and a width of 10 mm.

To test the effect of the pretreatment, the strips were after treatment bonded to an aluminium strip using an epoxy-based adhesive (Araldit Rapid). This test was carried out according to the ISO 4587 test for measurement of the shear-strength of adhesives.

The following scheme was followed:

A flow of 2 sccm Ar is established, and pumping is carried out until a steady-state situation is reached. After this, the plasma is ignited at a voltage of 280 V. After 20 s the 2-ethyl cyano acrylate containing bottle is opened, and the system is run for a further 30 s. After treatment the PTFE-strips were glued to sand-blasted Al-strips using the adhesive mentioned above.

The shear-strength of the bond was measured to be in excess of 2 N/mm$^2$, which is considerably higher than the value of 0.1 N/mm which is measured for untreated strips.

The same results have been achieved using a PUR-based adhesive.

EXAMPLE 2

Pretreatment of polypropylene (PP)

These experiments were carried out on pure PP (Hostalen PP from Hoechst). The samples were injection moulded pieces having dimensions of 75×25×1 mm. To test the increased adhesion, the PP pieces were after pretreatment painted using a solvent based acrylic paint (Motip Acryl Lack-Spray, Motip BV, Postbus 221, 8330 AE Steenwijk, Holland). The test was carried out according to the ISO 2409 international standard. Prior to the pretreatment the surfaces were washed in hexane and dried for 3 hours.

The following scheme was followed:

2 sccm Ar flow is established, and pumping is carried out until a steady-state situation is reached at a measured pressure of 10 pa. By the term "steady-state" is meant that Ar is pumped into the chamber and out again until the chamber is substantially free of air and a constant pressure is reached.

After a steady-state situation is reached, the 3-phase plasma is ignited at a voltage of 280V. After 10 s the voltage is reduced to 240 V, and the valve to the 2-ethyl cyano acrylate bottle (Bison Super glue) is opened. After further 30 s the voltage is reduced to 0V. After further 20 s the 2-ethyl cyano acrylate bottle is closed, and air is let into the vacuum vessel.

Approximately 1 hour after the pretreatment, the sample is painted using the paint mentioned above.

When testing painted PP, painted and pretreated according to the procedure outlined above, the test result obtained according to the ISO 2409 standard is determined to be "0–1".

When following the same procedure on untreated, painted polymer, the test result is determined to be "5".

The test results are determined in accordance with ISO 2409 by subjecting the material to a peel test and visually determining how strong the bonding between the substrate and the paint is. The lower the character, the better the bonding.

Improved adhesion may be achieved by using monomers other than ethyl-cyano-acrylate. To exemplify this, experiments similar to those described in example 1 and 2 were repeated using 2,4-diisocyanate instead of 2-ethyl-cyanoacrylate. The monomer used in the following examples was a commercial grade Aldrich 21,683-6 (80% toluene 2,4-diisocyanate, 20% 2,6 toluene 2,4-diisocyanate).

The results were similar to the results obtained in example 1 and 2, respectively.

EXAMPLE 3

The procedure for pretreatment was exactly as described in example 1. The only difference is that the ethyl cyanoacrylate in the vaporizer was substituted with the compound mentioned above. In this, later experiment the tensile strength of the bonding and not the shear strength was used to quantizize the improvement. The tensile strength of the bonding between untreated PTFE and epoxy was below the resolution of the used test equipment. The tensile strength of the bond between treated PTFE and epoxy was measured to be 7.6 N/mm$^2$. Failure of the bonding was due to cohesive failure in the PTFE material itself, and not due to debonding between PTFE and epoxy.

EXAMPLE 4

Polypropylene (PP) was treated according to the procedure described in example 2. The only difference is that the ethyl cyanoacrylate in the vaporizer was substituted with the compound mentioned above. In this, later experiment the improvement of bondstrength was quantified according to the procedure described in example 3. The measured tensile strength in this experiment was 14.8 N/mm² i.e. comparable to the theoretical strength of the used epoxy adhesive. No tests were carried out on non-treated PP samples, as it is known that it is not possible to achieve a bond between PP and epoxy.

EXAMPLE 5

The surface of injection moulded glas fibre reinforced polyamide 6.6 curved test specimens was modified as described in example 1. Seven days after this treatment the test specimens were painted with polyurethane lacquer: Alexit 341-83, 401-83, 401-54 and 412-00 from Mankiewicz GmbH, Hamburg).

Thereafter the test specimens were tested according to DIN 53 151 (lattice cutting with subsequent fixing and peeling of Tesa 4122). Scale from Gt0 to Gt5 (Gt0: no peeling). Hereby the following results were obtained:

|  | Lattice cutting | +Tesa 4122 |
|---|---|---|
| Alexit 341-83 | Gt0 | Gt0 |
| Alexit 401-83, 401-54, 412-00 | Gt0 | Gt0 |

The same result was obtained after ageing in a moist closet at 60° C. for 48 hours.

What is claimed is:

1. A method of modifying the surface of a solid polymer substrate comprising the steps of
    a) generating radicals on the substrate surface by subjecting it to a gas plasma or by subjecting it to ultraviolet light, and
    b) treating the surface with a vapour of a monomer or a monomer mixture comprising cyano acrylate and/or isocyanate,
    where step b) starts before step a), simultaneously with step a), during step a), or follows immediately after step a).

2. A method according to claim 1, wherein the monomer or monomer mixture comprises one or more of $C_1$–$C_{10}$ 2-alkyl cyano acrylate and diisocyanate.

3. A method according to claim 2, wherein the diisocyanate is toluene 2,4-diisocyanate.

4. A method according to claim 1 wherein step b) comprises treatment of the surface with a monomer mixture comprising acrylic acid, methyl acrylate, 2-hydroxyethylacrylate, N-ethyl-2-methyl allylamine, glycidyl methacrylate, diallylamine, and/or other vinyl group containing monomers.

5. A method according to claim 1, wherein step b) comprises treatment of the surface with a monomer vapour comprising 60 mole % or more of 2-ethyl cyano acrylate vapour.

6. A method according to claim 5, wherein step b) comprises treatment of the surface with a monomer vapour comprising 90 mole % or more of 2-ethyl cyano acrylate vapour.

7. A method according to claim 1, wherein the monomer mixture prior to the vaporization consists essentially of 2-ethyl cyano acrylate, an acid having a partial vapour pressure in the plasma which is lower than the partial vapour pressure of 2-ethyl cyano acrylate, and up to 40 weight-% of another filler.

8. A method according to claim 7, wherein the acid is a polyphosphoric acid and is present prior to the vaporization in a concentration up to 10 weight-%.

9. A method according to claim 1, wherein the polymer substrate is a silicone rubber or a thermoplastic.

10. A method according to claim 9, wherein the polymer substrate is selected from the group consisting of a polytetra fluoroethylene (PTFE), tetra fluoroethylene hexa fluoropropylene copolymer (FEP), polyvinyl difluoride (PVDF), nylon 6,6, nylon 11, and polyvinyl chloride (PVC).

11. A method according to claim 1, wherein the polymer substrate is a polyolefin.

12. A method according to claim 1, wherein the polymer substrate is an injection moulded polymer component, a polymer fiber, a polymer thread or a polymer filler.

13. A method according to claim 1, wherein the generation of radicals on the substrate surface is obtained by subjecting the substrate to a gas plasma, and the gas is an inert gas.

14. A method according to claim 1, wherein step a) comprises the step of generating radicals by use of a gas plasma generated by excitation of the gas in a direct current (DC), audio frequency (Ar), radio frequency or microwave generated electric field.

15. A method according to claim 1, wherein the monomer pressure in step b) is between 0.1 and 100000 Pa.

16. A method according to claim 15, wherein step a) is carried out for more than 30 seconds, and step b) is started 10 to 30 seconds after step a).

17. A method according to claim 1, wherein the generation step a) is carried out for a period of between 0.01 and 1000 seconds, and the treatment step b) is carried out for a period of between 0.1 and 1000 seconds.

18. A method according to claim 1, wherein the temperature is the same under both step a) and step b).

19. A method according to claim 18, wherein the temperature under both step a) and step b) is between 250 and 450 K.

20. A method according to claim 1, wherein the total pressure under step a) is equal to the total pressure under step b).

21. A method according to claim 20, wherein the total pressure under step a) and step b) is between 0.2 and 10000 Pa.

22. A polymer substrate modified according to claim 1.

23. A method of binding an organic binder material to a surface of a solid polymer substrate comprising the steps of
    modifying the surface of the substrate by the method according to claim 1, and
    bringing the organic material in contact with the surface of the substrate.

24. A method according to claim 23, herein the organic binder material is a paint, an adhesive or another polymer material.

25. A polymer bonded to an organic material by the method according to claim 23.

26. A polymer composite material according to claim 25, wherein the polymer substrate is a polymer fiber, a polymer thread or a polymer filler, and the organic material is another polymer.

* * * * *